United States Patent

Sawada et al.

Patent Number: 6,152,093
Date of Patent: Nov. 28, 2000

[54] STRATIFIED SCAVENGING TWO-CYCLE ENGINE AND CYLINDER BLOCK THEREFOR

[75] Inventors: Toshiharu Sawada, Fuchu; Hiroshi Kato, Hachioji; Takeshi Watanabe, Houya, all of Japan

[73] Assignee: Komatsu Zenoah Co., Tokyo, Japan

[21] Appl. No.: 09/250,764

[22] Filed: Feb. 16, 1999

[30] Foreign Application Priority Data

Oct. 30, 1998 [JP] Japan .................................. 10-324467

[51] Int. Cl.[7] ............................. A01D 34/00; A01D 75/18
[52] U.S. Cl. ...................................................... 123/73 PP
[58] Field of Search .............................. 123/73 PP, 73 A, 123/73 AF, 73 F, 65 VB, 65 VC, 65 P

[56] References Cited

U.S. PATENT DOCUMENTS

| | | | |
|---|---|---|---|
| 3,881,454 | 5/1975 | Jaulmes ................................ | 123/73 PP |
| 4,026,254 | 5/1977 | Ehrlick ................................ | 123/73 PP |
| 4,294,202 | 10/1981 | Boyesen .............................. | 123/73 PP |
| 5,740,767 | 4/1998 | Kaku et al. .......................... | 123/73 PP |

FOREIGN PATENT DOCUMENTS

1-18813  6/1989  Japan .
6-96185  11/1994  Japan .

*Primary Examiner*—Marguerite McMahon
*Attorney, Agent, or Firm*—Sidley & Austin

[57] ABSTRACT

A stratified scavenging two-cycle engine, having excellent scavenging performance and a simple structure which can be manufactured at low cost, includes a cast cylinder block (2, 2*a*) containing a cylinder chamber (9) and two scavenging ports (14, 14, 14*a*, 14*a*), which are provided in opposite portions of the interior wall surface of the cylinder chamber (9). Each scavenging port (14, 14*a*) *and the crank chamber* (7) are connected via a scavenging flow passage (20) which includes a generally horizontally extending scavenging flow passage segment (22, 22*a*) and a generally vertically extending scavenging flow passage segment (21). Two recesses (23, 23, 23*a*, 23*a*) are provided in the outer surface of the cylinder block (2, 2*a*) with each recess being an outwardly directed extension of a respective horizontally extending scavenging flow passage segment. An air supply flow passage member (30, 30*a*) is attached to the cylinder block to cover a respective recess. Each scavenging flow passage (20) and an air supply flow passage (31) are connected through a check valve (32).

25 Claims, 9 Drawing Sheets

STRATIFIED SCAVENGING TWO-CYCLE ENGINE AND CYLINDER BLOCK THEREFOR

TECHNICAL FIELD

The present invention relates to a stratified scavenging two-cycle engine, and more particularly to a cylinder block therefor which contains a scavenging flow passage.

BACKGROUND ART

Conventionally, in a stratified scavenging two-cycle engine having a scavenging flow passage, a method is frequently adopted in order to assuredly conduct stratified scavenging, in which a crank chamber and a cylinder chamber are connected via a hooked scavenging flow passage, which is composed of a vertical scavenging flow passage segment, provided outside the cylinder chamber, and a horizontal scavenging flow passage segment, for connecting the vertical scavenging flow passage segment and the cylinder chamber. The scavenging flow passage is often manufactured by gravity casting. However, the gravity casting method has a disadvantage in that the cost is high; therefore, manufacturing by die-casting is desirable. Examples of solutions to the above disadvantage are proposals made in Japanese Patent Publication (B2) No. 6-96185 and Japanese Utility Model Publication (Y2) No. 1-18813.

According to the disclosure in Japanese Patent Publication (B2) No. 6-96185, a cylinder liner is set within a cylinder block forming space, the inside of which is formed by using a plurality of die-casting dies. A die-casting die, for forming a scavenging passage horizontal segment which would penetrate to the outside of the cylinder block, and a die-casting die, for forming a scavenging passage vertical segment, extend within the cylinder block forming space, and molten metal is poured into the cylinder block forming space. After the molten metal is solidified, the die-casting dies are removed, and a blank cap is inserted into the outer portion of the scavenging passage horizontal segment which penetrates to the outside of the cylinder block, to block the opening to the outside of the cylinder block and thereby form an internal scavenging passage.

According to the aforesaid configuration, the cylinder liner is used for the cylinder block which is formed by the plurality of die-casting dies. In addition, in order to form a scavenging passage extending into the cylinder chamber, a protruding portion is formed on a die-casting die in such a manner as to form the scavenging passage horizontal segment which penetrates to the outside of the cylinder block. After casting, the die-casting die protruding portion is pulled out, and a blank cap is inserted into the outer portion of the formed scavenging passage horizontal segment, to thereby form the internal scavenging passage. Thus, the number of parts used, such as the cylinder liner, the die-casting die protruding portion, the blank cap, and the like, increases. Moreover, with the die-casting die protruding portion, the dies become more complicated and large-sized, and the cylinder block manufacturing processes and the working hours are increased. As a result, there arises a disadvantage in that the cost of manufacturing the cylinder block is high.

According to an art disclosed in Japanese Utility Model Publication No. 1-18813, an adapter, which includes a suction passage and a wall surface for forming a scavenging passage, is formed separately from the cylinder block; and the adapter is attached to an adapter attaching face, formed in the cylinder block, in order to form the scavenging passage.

However, in the latter configuration the adapter, which is separately formed, is attached to the adapter attaching face, which is formed on an outer peripheral face of the cylinder block, to form the scavenging passage, thereby increasing the number of parts, and complicating and increasing the manufacturing processes. Consequently, there arise disadvantages in that it takes more time to manufacture the cylinder block and the manufacturing cost becomes higher.

SUMMARY OF THE INVENTION

In view of the aforesaid disadvantages, an object of the present invention is to provide a cylinder block for a stratified scavenging two-cycle engine, which can be cast by die-casting, which has excellent scavenging performance and a structurally simple scavenging flow passage, and which can be manufactured at low cost.

A cylinder block for a stratified scavenging two-cycle engine according to the present invention is characterized in that the cylinder block contains: a cylinder chamber; an exhaust port and at least one scavenging port, each being provided in a sidewall of the cylinder block and extending into the cylinder chamber; at least one vertical scavenging flow passage segment, provided within the sidewall of the cylinder block; at least one horizontal scavenging flow passage segment cut in the sidewall of the cylinder block for connecting an upper end portion of a respective vertical scavenging flow passage segment and a respective scavenging port; a mixture supply passage, for supplying a mixture from a fuel supply means to the cylinder chamber; and at least one recess provided in the outer surface of the sidewall of the cylinder block with each recess being an extension, of a respective horizontal scavenging flow passage segment, to the outside of the cylinder block. Each recess can be formed in the sidewall during die casting or subsequent to the die casting, e.g. by boring. Each horizontal scavenging flow passage segment is formed in the die cast cylinder block by a suitable technique, e.g. cutting, drilling, etc.

A stratified scavenging two-cycle engine according to the present invention is characterized in that includes: a cylinder block, containing a cylinder chamber; a piston, positioned in the cylinder chamber so as to be vertically slidable; a crankcase, connected to the cylinder block and containing a crank chamber; an exhaust port and at least one scavenging port, each being provided in a sidewall of the cylinder block and extending into the cylinder chamber; at least one vertical scavenging flow passage segment, provided within the sidewall of the cylinder block, a lower end portion of each vertical scavenging flow passage segment being connected to the crank chamber; at least one horizontal scavenging flow passage segment, for connecting an upper end portion of a respective vertical scavenging flow passage segment and a respective scavenging port; at least one check valve; an air supply passage, for supplying air through a check valve to a respective scavenging flow passage which includes a respective vertical scavenging flow passage segment and a respective horizontal scavenging flow passage segment; a mixture supply passage, for supplying a mixture from a fuel supply means to the cylinder chamber; and at least one recess provided in the outer surface of the sidewall of the cylinder block with each recess being an extension, of a respective planned horizontal scavenging flow passage segment, to the outside of the cylinder block.

According to the aforesaid configuration, each recess, which is provided in the outer surface of the sidewall of the cylinder block at a location corresponding to an extension of a respective planned horizontal scavenging flow passage segment toward the outside of the cylinder block, enables the manufacture of the cylinder block without forming the horizontal scavenging flow passage segment by casting, and the subsequent formation of the respective horizontal scavenging flow passage segment by cutting a through-hole in the cylinder block from the outside of the cylinder block by initiating the through-hole in the recess. Accordingly, in casting the cylinder block, a die for forming the horizontal scavenging flow passage segment is unnecessary, thus making it possible to manufacture the cylinder block with a small-sized and structurally simple die-casting die. Consequently, the number of parts of the die and the number of manufacturing processes decrease, whereby the cylinder block can be manufactured at low cost.

Moreover, the scavenging port and the horizontal scavenging flow passage segment can be formed by cutting a through-hole which begins in the recess and penetrates the inner face of the cylinder chamber.

According to this configuration of the invention, since the scavenging port and the horizontal scavenging flow passage segment are formed by cutting work rather than by die casting, the positions, directions, diameter dimensions, and the like of the scavenging port and the horizontal scavenging flow passage segment can be precisely achieved. In addition, this configuration of the invention can easily cope with a design change in the horizontal scavenging flow passage segment, without having to change the design of the casting die, by setting the position, direction, diameter dimension, and the like in the cutting work at predetermined values, whereby a cylinder block with good scavenging performance can be manufactured at low cost.

Further, it is possible for the through-hole to be bored in the cylinder block at an inclination of a predetermined angle to a line which is perpendicular to the central axis of the cylinder chamber wherein the predetermined angle lies within a plane which is at least generally perpendicular to the central axis of the cylinder chamber. It is also possible for the recess to be provided with a face which is at least generally perpendicular to the longitudinal axis of the through-hole, and for the recess to be provided with a clearance notch at a mounting seat for an air supply flow passage member disposed at the outer rim of the recess for preventing interference with tools used in the cutting work.

According to this configuration of the invention, the scavenging port and the horizontal scavenging flow passage segment can be formed so as to be directed toward the portion of the inner face of the cylinder chamber which is opposite the exhaust port by boring the cutting through-hole in such a manner that a longitudinal axis of the cutting through-hole is inclined at a predetermined angle to a line which is perpendicular to the central axis of the cylinder chamber wherein the predetermined angle lies in a plane which is perpendicular to the central axis of the cylinder chamber. Accordingly, the directions of the scavenging port and the horizontal scavenging flow passage segment can be properly set so as to improve the scavenging performance. Thus, air can be directed into the inner part of the cylinder chamber opposite the exhaust port at the time of scavenging, to thereby push exhaust gas through the exhaust port, thereby leading to an improvement in the scavenging performance. Besides, since the recess is provided with a face which is perpendicular to the longitudinal axis of the cutting through-hole, tools such as a drill, an end mill, and the like, never slide during the cutting work, whereby the cutting work can be surely and easily conducted. Incidentally, the face perpendicular to the longitudinal axis of the cutting through-hole can be a face which is a cast surface or a wrought face. In addition, since the clearance notch, for preventing interference with tools in the cutting work, is provided in the mounting seat for the air supply flow passage member, the cutting work is easily conducted without interference, thus improving product quality, decreasing the man-hours required for the work, and enabling the manufacture of low-cost cylinder blocks.

Furthermore, an air supply flow passage member, having a protruding portion, can be attached to the cylinder block to cover the recess with the protruding portion protruding into the recess; a guide face, with an inclination of a predetermined angle, can be provided at the front end portion of the protruding portion; and the horizontal scavenging flow passage segment can be formed with an inclination of a predetermined angle to a line which is perpendicular to the central longitudinal axis of the cylinder chamber wherein the predetermined angle lies in a plane which is perpendicular to the central longitudinal axis of the cylinder chamber.

According to this configuration, the protruding portion, having the guide face with an inclination of a predetermined angle at the front end portion thereof, is provided in the air supply flow passage member, the air supply flow passage member being attached to the cylinder block over the recess, which makes it possible for the horizontal scavenging flow passage segment to be formed so as to slant toward the portion of the inner face of the cylinder chamber which is opposite to the exhaust port. Therefore, air is directed along the guide face into the inner part of the cylinder chamber, thus improving the scavenging performance. The air supply flow passage member, which is light and small, can be wrought without directly working the heavy cylinder block, thereby facilitating handling in working and reducing the working cost.

BEST MODE FOR CARRYING OUT THE INVENTION

Preferable embodiments of the present invention will be described in detail below with reference to the attached drawings.

Figure 1:
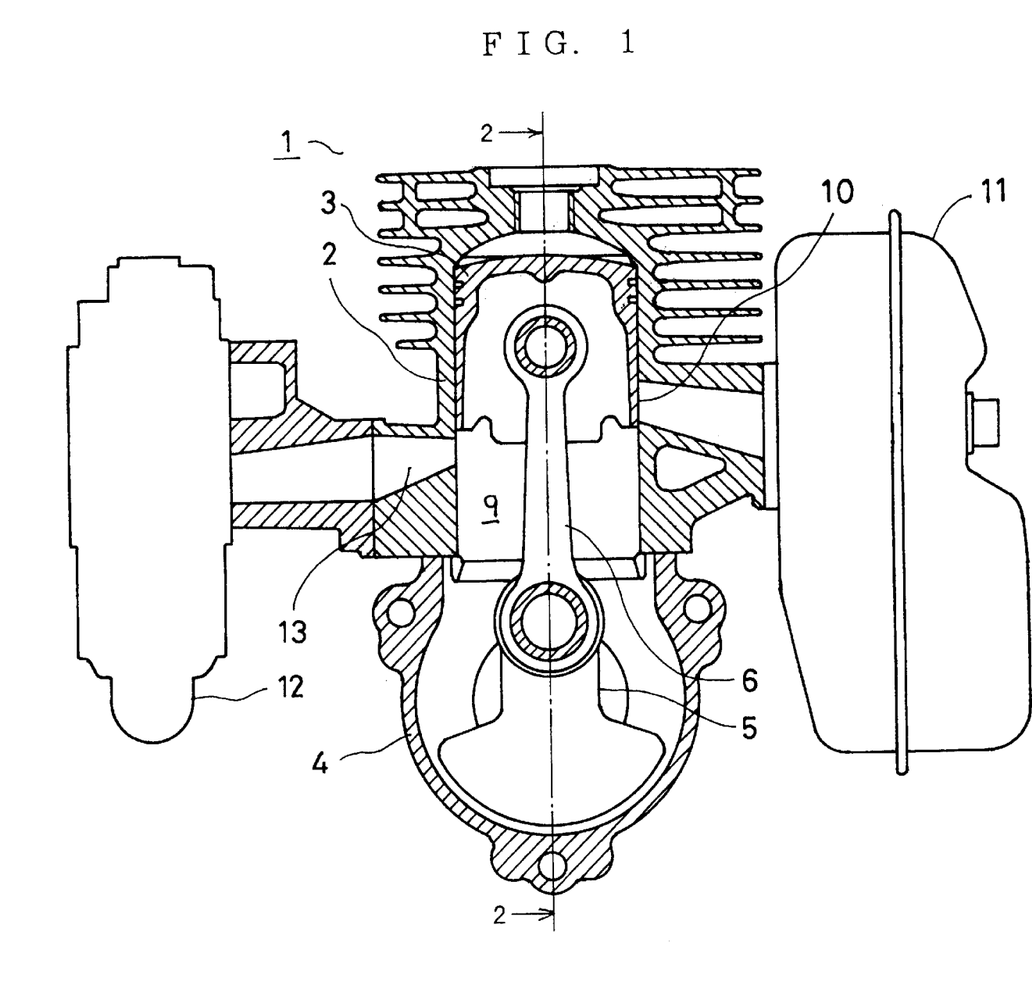
FIG. 1 is a front view, partly in cross section, of a stratified scavenging two-cycle engine including a cylinder block in accordance with the present invention.

In FIG. 1, a piston 3 is housed vertically and slidably in a cylinder chamber 9 which is formed in the cylinder block 2 of a stratified scavenging two-cycle engine 1, and a crankcase 4 is attached to the lower end face of the cylinder block 2, with the crank chamber 7 being open to the lower end of the cylinder chamber 9. A crankshaft 5 is rotatably attached in the crankcase 4, and the piston 3 and the crankshaft 5 are connected to each other by a connecting rod 6. An exhaust port 10 is formed in one side portion of the wall surface of the cylinder chamber 9 in the cylinder block 2 and is flow connected to a muffler 11. Formed in the opposite side portion of the wall surface of the cylinder chamber 9 in the cylinder block 2 is a mixture supply flow passage 13, which is flow connected to a carburetor (a fuel supply means) 12.

Figure 2:
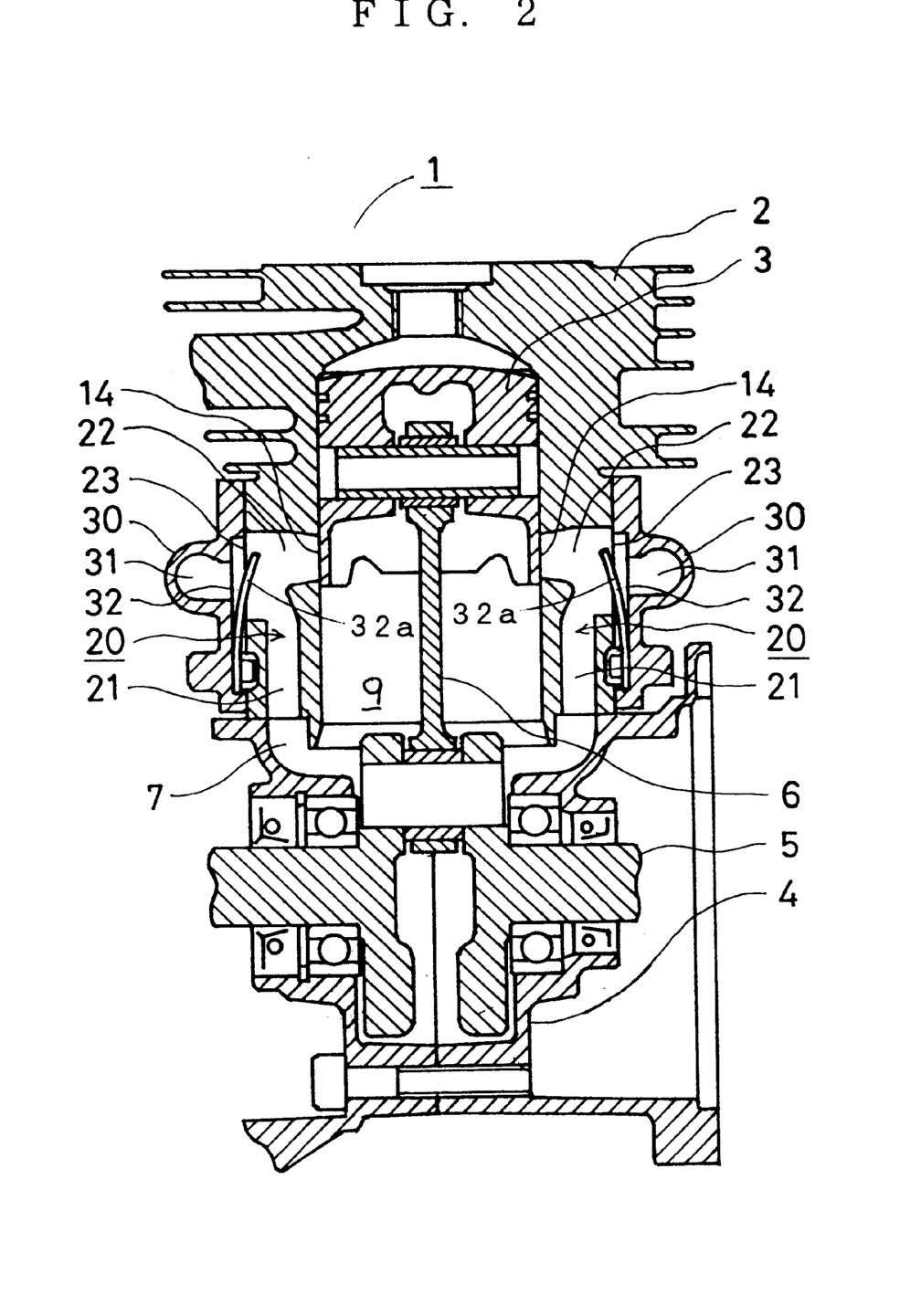
FIG. 2 is a sectional view taken along the sectional line 2—2 in FIG. 1.

In FIG. 2, two scavenging ports 14 and 14, which are opposite each other, are provided in the wall surface of the cylinder chamber 9 in the cylinder block 2; and each scavenging port 14 communicates with the crank chamber 7 via an associated scavenging flow passage 20, which is formed within the wall of the cylinder block 2. The upper portion of each scavenging flow passage 20 leads to a respective recess 23, which is open to the exterior of the cylinder block 2. An air supply flow passage 31 is provided in a respective air supply flow passage member 30, which is attached to the cylinder block 2 so as to cover a respective recess 23, each air supply flow passage 31 being flow connected to a respective scavenging flow passage 20 via a respective check valve 32, which is disposed between the respective air supply flow passage 31 and the associated recess 23. Each check valve 32 includes a check valve stopper 32a as a stopper plate.

When the piston 3 descends in a scavenging stroke, first the exhaust port 10 opens; subsequently the scavenging ports 14 open and compressed air flows from the air supply flow passages 31 into the cylinder chamber 9 in the cylinder block 2 so that a portion of the exhaust gas in the cylinder chamber 9 is exhausted from the cylinder chamber 9 via the exhaust port 10. Next, a mixture flows from the scavenging flow passages 20 to thereby conduct stratified scavenging.

Figure 3:
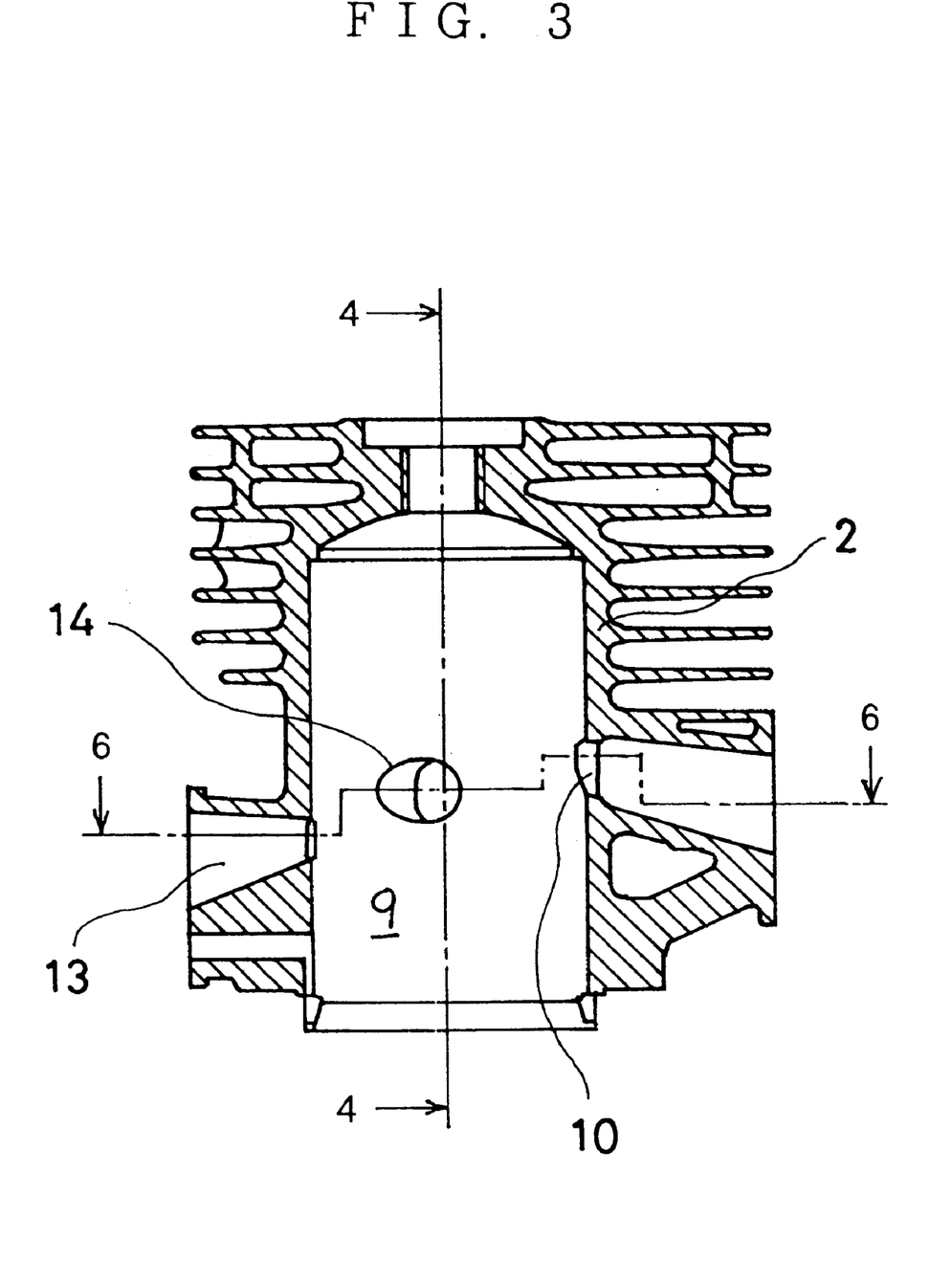
FIG. 3 is a front sectional view of a cylinder block in accordance with a first embodiment of the present invention.

The configuration of the cylinder block 2 will be described in detail below. FIG. 3 shows the cylinder block 2 in accordance with a first embodiment of the invention. The exhaust port 10, a mixture supply flow passage 13, and the scavenging ports 14 are formed in the wall surface of the cylinder chamber 9 in the cylinder block 2.

Figure 4:
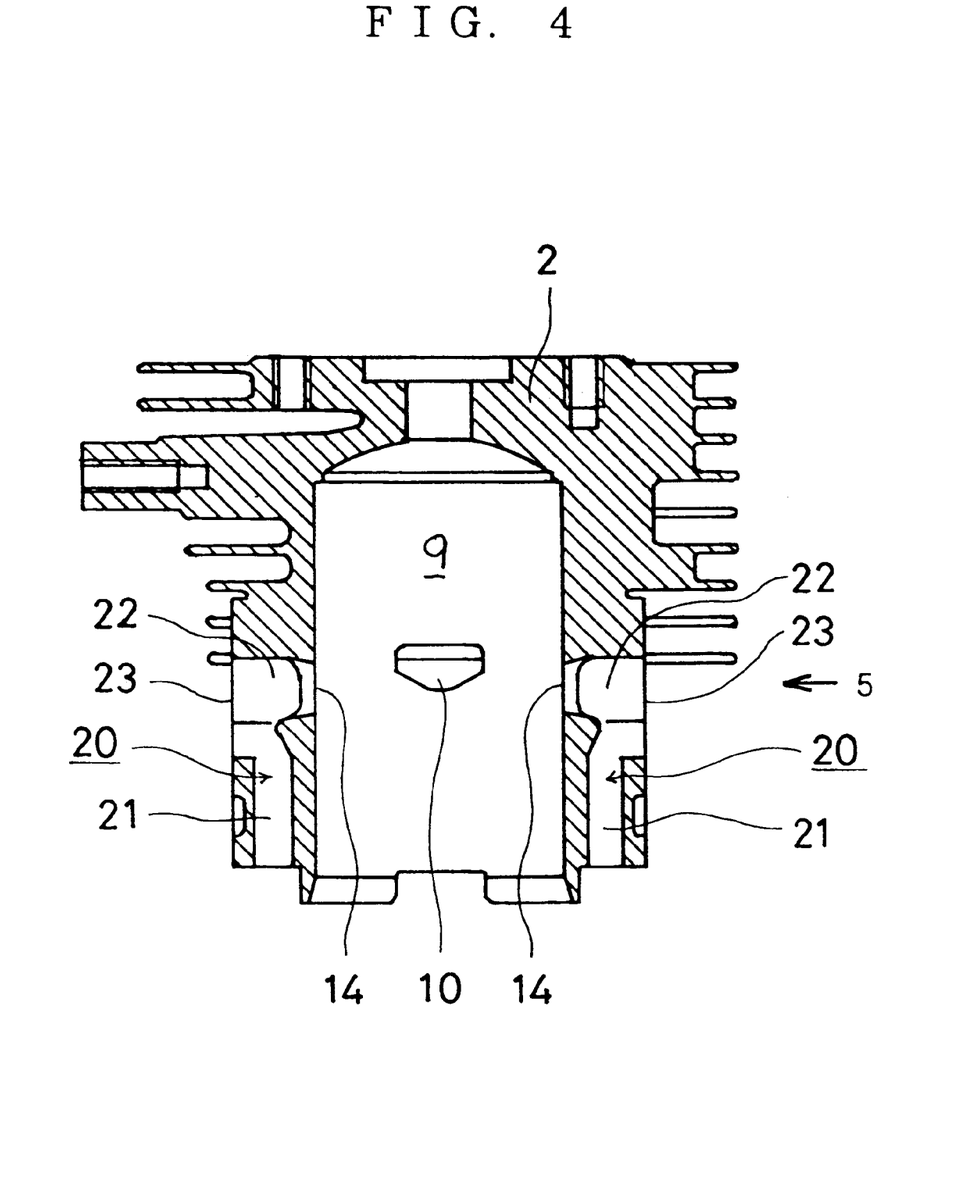
FIG. 4 is a side sectional view taken along the sectional line 4—4 in FIG. 3.

In FIG. 4, two scavenging flow passages 20 and 20, which are opposite each other, are each formed vertically within the sidewall of the cylinder chamber 9 in the cylinder block 2. Each scavenging flow passage 20 is composed of a vertical scavenging flow passage segment 21, which penetrates the lower end portion of the cylinder block 2 so as to communicate with the crank chamber 7, and a horizontal scavenging flow passage segment 22 for connecting the upper end portion of a vertical scavenging flow passage segment 21 and the associated scavenging port 14. Each recess 23 is formed in the outer surface of the sidewall of the cylinder block 2 so as to be an extension of a horizontal scavenging flow passage segment 22 toward the outside of the cylinder block 2.

Figure 5:
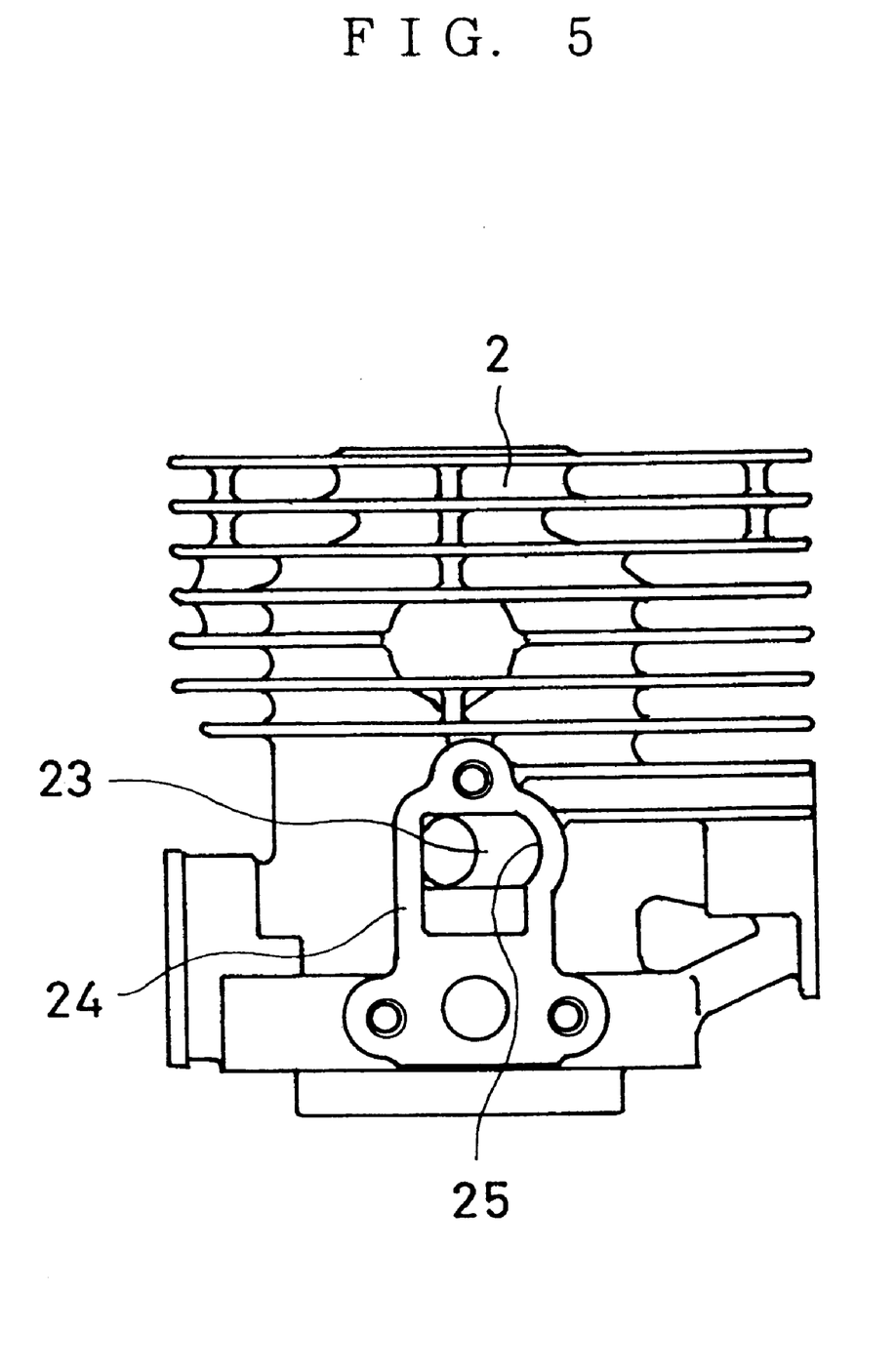
FIG. 5 is a front view of the cylinder block as seen from the arrow 5 in FIG. 4.

In FIG. 5, a mounting seat 24, for mounting an air supply flow passage member 30 (see FIG. 2) is formed in the outer surface of the sidewall of the cylinder block 2 so as to surround the outer rim of the respective recess 23, while leaving the recess 23 open to the exterior of the cylinder block 2. A clearance notch 25 is provided in the mounting seat 24 at one side of the recess 23.

Figure 6:
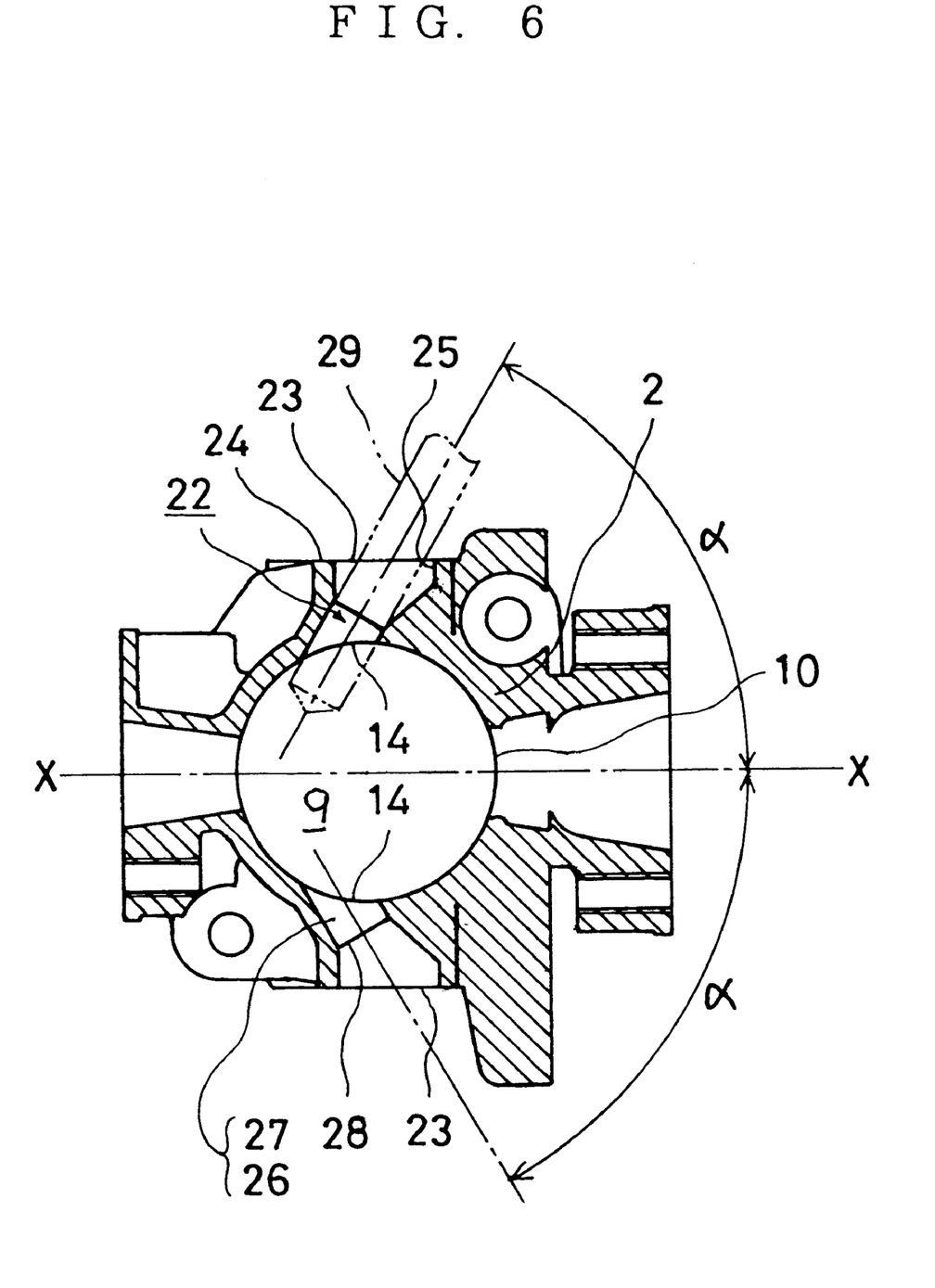
FIG. 6 is a sectional view taken along the sectional line 6—6 in FIG. 3.

FIG. 6 shows the configuration of the horizontal scavenging flow passage segments 22 of the first embodiment of the invention. Two recesses 23 and 23 are provided in opposite outer faces of the cylinder block 2. Each recess 23 is formed in the sidewall of the cylinder block 2 by a suitable technique, e.g. by casting or boring. Then a cutting through-hole 27 is drilled in the sidewall of the cylinder block 2, beginning at an inner surface of the respective recess 23 and extending into the cylinder chamber 9, thereby forming a horizontal scavenging flow passage segment 22 and a scavenging port 14. Each drilled through-hole 27 is inclined at a predetermined angle $\alpha$ to the X—X line which is perpendicular to the central axis of the cylinder chamber and which connects the central axis of the cylinder chamber 9 and the center of the exhaust port 10, with the predetermined angle a being in a plane which is perpendicular to the central axis of the cylinder chamber 9. The two drilled through-holes 27 are symmetrically positioned on opposite sides of the X—X line, when viewed in a plane perpendicular to the central axis of the cylinder chamber 9. Each drilling through-hole 27 is directed toward a portion of the inner face of the cylinder chamber 9 which is opposite the exhaust port 10. Each recess 23 is provided with a face 28 which is perpendicular to the axial direction of the drilling through-hole 27. In addition, each clearance notch 25 is provided in a mounting seat 24 at the rim of a respective recess 23 so as to prevent interference with tools when the respective drilling through-hole 27 is wrought by a drill 29.

As described above, in the cylinder block 2 according to the present invention, each recess 23 is formed in the sidewall of the cast cylinder block 2 so as to be an extension of a planned horizontal scavenging flow passage segment 22 toward the outside of the cylinder block 2, which enables the subsequent formation of the respective horizontal scavenging flow passage segment 22 and the associated scavenging port 14 by cutting work from the outside of the cylinder block 2 with the use of the recess 23. Therefore, a projecting portion of a die-casting die, for forming a horizontal scavenging flow passage segment 22 and a scavenging port 14 which has been conventionally required, becomes unnecessary; thus simplifying the die-casting die for forming the scavenging flow passage 20 and the cylinder block 2 in the vicinity of a scavenging port 14, and reducing the number of die-casting dies. Accordingly, the die-casting die can be structurally simplified, decreased in size compared with the conventional one, and easily manufactured, whereby the manufacturing processes for the cylinder block 2 are decreased. As a result, a less expensive cylinder block 2 can be manufactured.

Moreover, the positions, directions, diameter dimensions, and the like of the horizontal scavenging flow passage segment 22 and the scavenging port 14 can be precisely wrought by simple cutting work such as drilling work or the like, thereby forming the horizontal scavenging flow passage segment 22 with great precision and achieving good scavenging performance. Accordingly, the high quality cylinder block 2 can be manufactured at a low cost.

Each horizontal scavenging flow passage segment 22 and the associated scavenging port 14 are formed in such a manner that the central longitudinal axis thereof is directed toward a portion of the inner surface of the cylinder chamber 9 which is opposite the exhaust port 10. Thus, air at the time of scavenging is directed into the inner part of the cylinder chamber 9 which is opposite to the exhaust port 10 of the cylinder chamber 9, and exhaust gas at the inner part of the cylinder chamber 9 is exhausted through the exhaust port 10, which enables efficient scavenging. In addition, when the horizontal scavenging flow passage segment 22 and the scavenging port 14 are drilled, the drill 29 does not slide, whereby drilling work can be easily conducted with excellent positioning accuracy. Moreover, when working is conducted with the drill 29 being tilted, the recess 23 does not interfere with the drill 29, and thus the cylinder block 2 of good quality can be manufactured.

Figure 7:
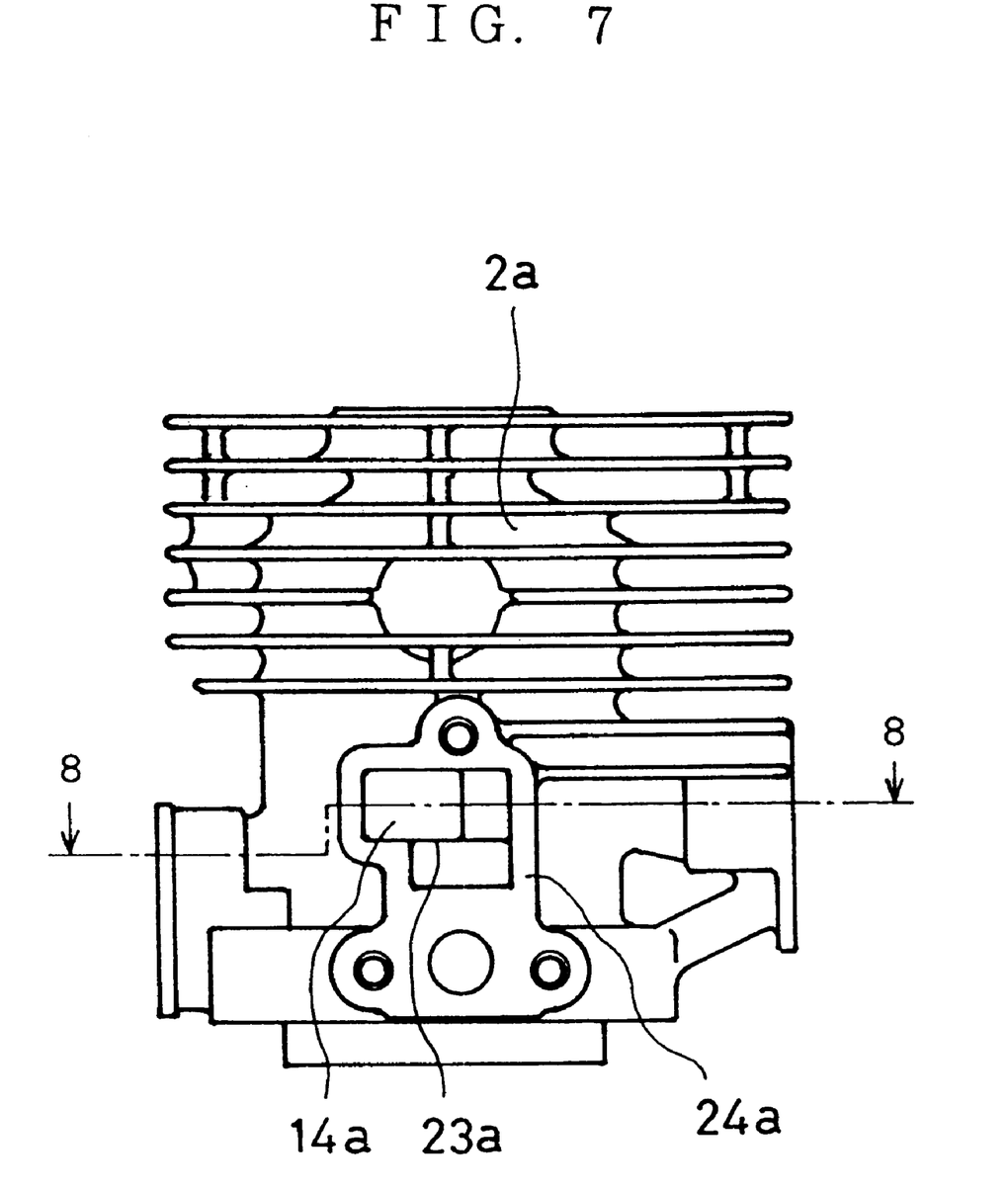
FIG. 7 is a front view of a cylinder block in accordance with a second embodiment of the present invention.
Figure 8:
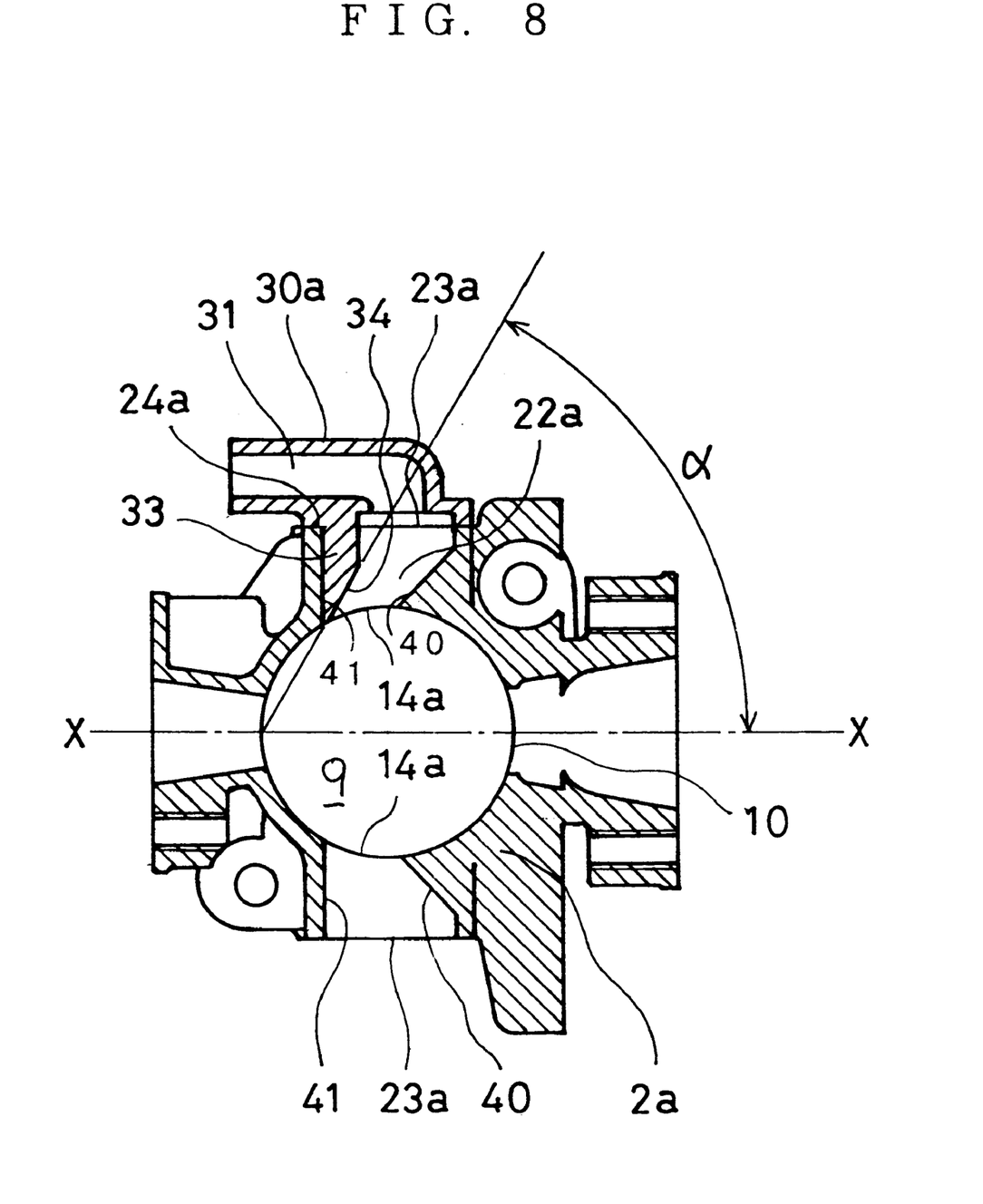
FIG. 8 is a sectional view taken along the sectional line 8—8 in FIG. 7.

Next, a cylinder of a second embodiment of the present invention will be described. FIG. 7 is a front view of a cylinder block 2a. The upper portion of FIG. 8 shows a state wherein an air supply flow passage member 30a is attached to the cylinder block 2a. In FIGS. 7 and 8, recesses 23a and 23a, which are rectangular in side view, are provided in opposite side faces of the cylinder block 2a. A horizontal scavenging flow passage segment 22a extends from an inner face of a respective recess 23a to the respective scavenging port 14a, which is provided in the inner wall surface of the cylinder chamber 9 in the cylinder block 2a. As shown in the lower portion of FIG. 8, an inner face 40 on the exhaust port 10 side of the inner surface of each recess 23a can be inclined in such a manner that as the faces 40 extend from the outside of the cylinder block 2a toward the cylinder chamber 9, the inclined faces 40 converge toward the cylinder chamber 9 and away from the exhaust port 10. The face 41 of each recess 23a, which is opposite from the exhaust port 10, is perpendicular to an extension of the line X—X which is perpendicular to the central axis of the cylinder chamber 9 and which connects the center of the exhaust port 10 and the central axis of the cylinder chamber 9 in the cylinder block 2a.

Figure 9:
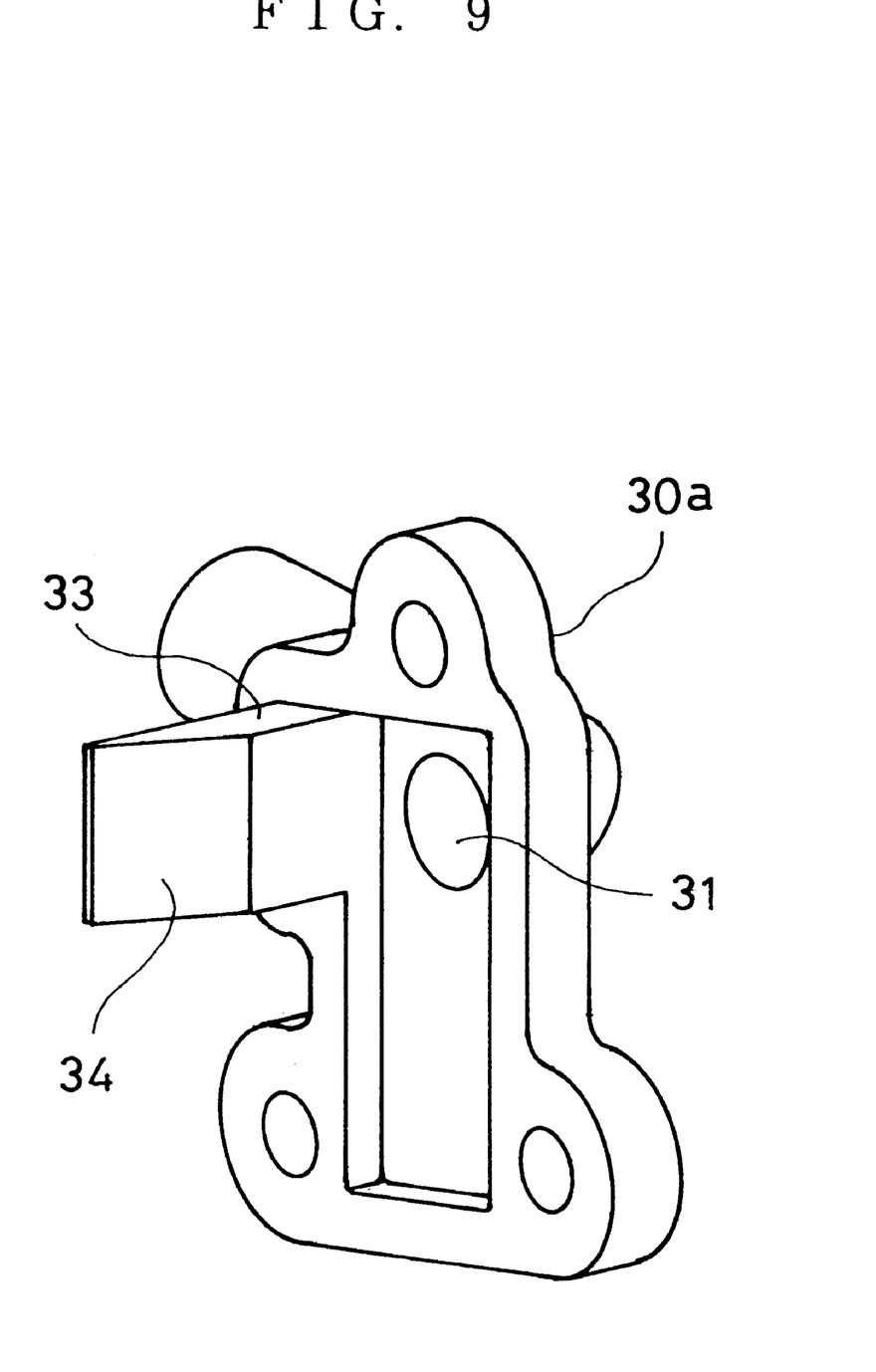
FIG. 9 is a perspective view of an air supply flow passage member of the second embodiment of the present invention.

As shown in the upper portion of FIG. 8, a mounting seat 24a is provided in the outer surface of the cylinder block 2a surrounding the outer rim of the recess 23a, and an air supply flow passage member 30a, having the air supply flow passage 31 formed therein, is mounted to the mounting seat 24a so as to cover the recess 23a. At the front end portion of the air supply flow passage member 30a, which faces the cylinder block 2a, a protruding portion 33 protrudes into the recess 23a on the face 41 side of the recess 23a and along the face 41. As shown in FIGS. 8 and 9, an inclined guide face 34 is provided on the inside of the protruding portion 33 of the air supply flow passage member 30a. As shown in FIG. 8, the guide face 34 is at an angle a to the line X—X, wherein the angle α lies in a plane which is perpendicular to the central axis of the cylinder chamber 9. A horizontal scavenging flow passage segment 22a, which is directed toward the portion of the inner face of the cylinder chamber 9 opposite the exhaust port 10, is formed by the inclined face 40 and the guide face 34.

The functional operation of the second embodiment is basically the same as that of the first embodiment and the detailed explanation thereof is omitted. According to the configuration of the second embodiment, when the horizontal scavenging flow passage segment 22a with an inclination of the predetermined angle α to the line X—X is formed by cutting work, the air supply flow passage member 30a, which is light and small, is separately worked. Therefore, handling and working is easier, compared with a configuration in which he heavy and large-sized cylinder block 2a itself is directly wrought. Consequently, working man-hours can be decreased. Although each recess 23a is rectangular in side view and the air guide face 34 of the air supply flow passage member 30a as a flat surface in this embodiment, the recess 23a and the air guide face 34 can have other shapes, for example, the recess 23a can be rounded at both ends and the air guide face 4 can have an arc shaped surface.

The first and second embodiments are described on the assumption of die casting, but different casting such as gravity casting, high pressure casting, or the like is also possible.

Reasonable variations and modifications are possible within the scope of the foregoing description, the drawings, and the appended claims to the invention.

That which is claimed is:

1. A cylinder block which is suitable for use in a stratified scavenging two-cycle engine, wherein:
    said cylinder block has a cylinder chamber formed therein;
    a sidewall of said cylinder block has an exhaust port and at least two scavenging ports formed therein;
    said sidewall of said cylinder block has at least two vertical scavenging flow passage segments formed therein;
    said sidewall of said cylinder block has at least two horizontal scavenging flow passage segments cut therein with each horizontal scavenging flow passage segment connecting an upper end portion of a respective vertical scavenging flow passage segment and a respective scavenging port; and
    said sidewall of said cylinder block has at least two recesses formed in an exterior surface of said sidewall, with each recess being an extension of a respective horizontal scavenging flow passage segment toward an outside of said cylinder block.

2. A cylinder block which is suitable for use in a stratified scavenging two-cycle engine, wherein:
    said cylinder block has a cylinder chamber formed therein;
    a sidewall of said cylinder block has an exhaust port and at least one scavenging port formed therein;
    said sidewall of said cylinder block has at least one vertical scavenging flow passage segment formed therein;
    said sidewall of said cylinder block has at least one horizontal scavenging flow passage segment cut therein connecting an upper end portion of a respective vertical scavenging flow passage segment and a respective scavenging port; and
    said sidewall of said cylinder block has at least one recess formed in an exterior surface of said sidewall, with each recess being an extension of a respective horizontal scavenging flow passage segment toward an outside of said cylinder block;
    wherein said cylinder block is die cast without any of said at least one horizontal scavenging flow passage segment formed therein, and wherein each horizontal scavenging flow passage segment is subsequently cut in the thus die cast cylinder block by boring with the boring being initiated in a respective recess.

3. A cylinder block in accordance with claim 2, wherein each recess is formed in said cylinder block by die casting.

4. A cylinder block in accordance with claim 2, wherein each recess is formed in said cylinder block by boring.

5. A cylinder block in accordance with claim 1, wherein each horizontal scavenging flow passage segment has a longitudinal axis which is inclined at a respective angle to a line which is perpendicular to a central longitudinal axis of said cylinder chamber and which connects the central longitudinal axis of said cylinder chamber and a center of said exhaust port, and wherein each respective angle lies within a plane which is perpendicular to the central longitudinal axis of said cylinder chamber.

6. A cylinder block which is suitable for use in a stratified scavenging two-cycle engine, wherein:
    said cylinder block has a cylinder chamber formed therein;

a sidewall of said cylinder block has an exhaust port and at least one scavenging port formed therein;

said sidewall of said cylinder block has at least one vertical scavenging flow passage segment formed therein;

said sidewall of said cylinder block has at least one horizontal scavenging flow passage segment cut therein connecting an upper end portion of a respective vertical scavenging flow passage segment and a respective scavenging port; and said sidewall of said cylinder block has at least one recess formed in an exterior surface of said sidewall, with each recess being an extension of a respective horizontal scavenging flow passage segment toward an outside of said cylinder block;

wherein said at least one horizontal scavenging flow passage segment comprises two horizontal scavenging flow passage segments which are positioned on opposite sides of a line which is perpendicular to a central longitudinal axis of said cylinder chamber and which connects the central longitudinal axis of said cylinder chamber and a center of said exhaust port when viewed in a plane which is perpendicular to the central longitudinal axis of said cylinder chamber.

7. A cylinder block in accordance with claim 6, wherein said cylinder block is die cast without any of said at least one horizontal scavenging flow passage segment formed therein, and wherein each horizontal scavenging flow passage segment is subsequently cut in the thus die cast cylinder block by boring with the boring being initiated in a respective recess.

8. A cylinder block in accordance with claim 6, wherein each recess is formed in said cylinder block by die casting.

9. A cylinder block in accordance with claim 6, wherein each recess is formed in said cylinder block by boring.

10. A stratified scavenging two-cycle engine comprising:

a cylinder block, having a cylinder chamber formed therein;

a piston, positioned in said cylinder chamber so as to be vertically slidable therein;

a crankcase, connected to said cylinder block and containing a crank chamber;

a sidewall of said cylinder block having an exhaust port and at least two scavenging ports formed therein;

said sidewall of said cylinder block having at least two vertical scavenging flow passage segments formed therein, with a lower end portion of each vertical scavenging flow passage segment being flow connected to said crank chamber;

said sidewall of said cylinder block having at least two horizontal scavenging flow passage segments cut therein, each said horizontal scavenging flow passage segment connecting an upper end portion of a respective vertical scavenging flow passage segment and a respective scavenging port, wherein a horizontal scavenging flow passage segment and an associated vertical scavenging flow passage segment constitute a scavenging flow passage;

at least one check valve;

means for supplying air through a check valve to a scavenging flow passage;

means for supplying mixture from a fuel supply means to said cylinder chamber; and said sidewall of said cylinder block having at least two recesses formed in an exterior surface of said sidewall, with each recess being an extension of a respective horizontal scavenging flow passage segment toward an outside of said cylinder block.

11. A stratified scavenging two-cycle engine in accordance with claim 10, wherein each scavenging port and an associated horizontal scavenging flow passage segment are constituted by a cutting through-hole which extends from a respective recess to an inner face of said cylinder chamber.

12. A stratified scavenging two-cycle engine in accordance with claim 11, wherein each cutting through-hole has a longitudinal axis which is inclined at a respective angle to a line which is perpendicular to a central longitudinal axis of said cylinder chamber and which connects the central longitudinal axis of said cylinder chamber and a center of said exhaust port, wherein each respective angle lies within a plane which is perpendicular to the central longitudinal axis of said cylinder chamber.

13. A stratified scavenging two-cycle engine in accordance with claim 12, wherein each recess has a face which is perpendicular to the longitudinal axis of the cutting through-hole which extends from the respective recess.

14. A stratified scavenging two-cycle engine in accordance with claim 13, wherein said cylinder block has at least one mounting seat for mounting an air supply flow passage member over a respective recess, and wherein each mounting seat is provided with a clearance notch adjacent a rim of the respective recess for preventing interference with tools used in cutting the respective through-hole.

15. A stratified scavenging two-cycle engine comprising:

a cylinder block, having a cylinder chamber formed therein;

a piston, positioned in said cylinder chamber so as to be vertically slidable therein;

a crankcase, connected to said cylinder block and containing a crank chamber;

a sidewall of said cylinder block having an exhaust port and at least one scavenging port formed therein;

said sidewall of said cylinder block having at least one vertical scavenging flow passage segment formed therein, with a lower end portion of each vertical scavenging flow passage segment being flow connected to said crank chamber;

said sidewall of said cylinder block having at least one horizontal scavenging flow passage segment cut therein for connecting an upper end portion of a respective vertical scavenging flow passage segment and a respective scavenging port, wherein a horizontal scavenging flow passage segment and an associated vertical scavenging flow passage segment constitute a scavenging flow passage;

at least one check valve;

means for supplying air through a check valve to a scavenging flow passage;

means for supplying mixture from a fuel supply means to said cylinder chamber; and said sidewall of said cylinder block having at least one recess formed in an exterior surface of said sidewall, with each recess being an extension of a respective horizontal scavenging flow passage segment toward an outside of said cylinder block;

wherein said cylinder block is die cast without any of said at least one horizontal scavenging flow passage segment formed therein, and wherein each horizontal scavenging flow passage segment is subsequently cut in the thus die cast cylinder block by boring with the boring being initiated in a respective recess.

16. A stratified scavenging two-cycle engine in accordance with claim 15, wherein each recess is formed in said cylinder block by die casting.

17. A stratified scavenging two-cycle engine in accordance with claim 15, wherein each recess is formed in said cylinder block by boring.

18. A stratified scavenging two-cycle engine comprising:

a cylinder block, having a cylinder chamber formed therein;

a piston, positioned in said cylinder chamber so as to be vertically slidable therein;

a crankcase, connected to said cylinder block and containing a crank chamber;

a sidewall of said cylinder block having an exhaust port and at least one scavenging port formed therein;

said sidewall of said cylinder block having at least one vertical scavenging flow passage segment formed therein, with a lower end portion of each vertical scavenging flow passage segment being flow connected to said crank chamber;

said sidewall of said cylinder block having at least one horizontal scavenging flow passage segment cut therein for connecting an upper end portion of a respective vertical scavenging flow passage segment and a respective scavenging port, wherein a horizontal scavenging flow passage segment and an associated vertical scavenging flow passage segment constitute a scavenging flow passage;

at least one check valve;

means for supplying air through a check valve to a scavenging flow passage;

means for supplying mixture from a fuel supply means to said cylinder chamber; and said sidewall of said cylinder block having at least one recess formed in an exterior surface of said sidewall, with each recess being an extension of a respective horizontal scavenging flow passage segment toward an outside of said cylinder block;

at least one air supply flow passage member attached to said cylinder block to cover a respective recess, each air supply flow passage member having a protruding portion which protrudes into the respective recess.

19. A stratified scavenging two-cycle engine in accordance with claim 18, wherein each protruding portion has a guide face provided on an end portion of the protruding portion which protrudes into the respective recess, each guide face being inclined at a first predetermined angle to a line which is perpendicular to a central longitudinal axis of said cylinder chamber and which connects said central longitudinal axis of said cylinder chamber and a center of said exhaust port, wherein said first predetermined angle lies within a plane which is perpendicular to the central longitudinal axis of said cylinder chamber.

20. A stratified scavenging two-cycle engine in accordance with claim 19, wherein each horizontal scavenging flow passage segment is inclined at a second predetermined angle to said line which is perpendicular to said central longitudinal axis of said cylinder chamber and which connects said central longitudinal axis of said cylinder chamber and said center of said exhaust port, wherein said second predetermined angle lies within a plane which is perpendicular to the central longitudinal axis of said cylinder chamber.

21. A stratified scavenging two-cycle engine in accordance with claim 20, wherein said at least one horizontal scavenging flow passage segment comprises two horizontal scavenging flow passage segments which are positioned on opposite sides of said line which is perpendicular to the central longitudinal axis of said cylinder chamber and which connects the central longitudinal axis of said cylinder chamber and the center of said exhaust port when viewed in a plane which is perpendicular to the central longitudinal axis of said cylinder chamber.

22. A method for manufacturing a cylinder block for a stratified scavenging two-cycle engine, said method comprising the steps of:

die casting a cylinder block, having a cylinder chamber therein; and cutting at least one scavenging port and a generally horizontally extending scavenging flow passage segment in a sidewall of said cylinder block by initiating the cutting in a respective recess formed in an outer surface of the die cast cylinder block.

23. A method in accordance with claim 22, further comprising the step of forming each said recess in the outer surface of the cylinder block as part of the die casting of the cylinder block.

24. A method in accordance with claim 22, further comprising the step of forming each said recess in the outer surface of the cylinder block by boring the respective recess in the die cast cylinder block.

25. A method in accordance with claim 22, wherein said cylinder block has an exhaust port formed therein; and wherein the step of cutting at least one scavenging port and a generally horizontally extending scavenging flow passage segment in a sidewall of said cylinder block comprises:

cutting two horizontal scavenging flow passage segments in the sidewall of said cylinder block, with each horizontal scavenging flow passage segment having a longitudinal axis which is inclined at a predetermined angle to a line which is perpendicular to a central longitudinal axis of said cylinder chamber and which connects the central longitudinal axis of said cylinder chamber and a center of said exhaust port, with said predetermined angle being in a plane which is perpendicular to the central longitudinal axis of said cylinder chamber.

* * * * *